US008203228B2

(12) United States Patent  
Smith (10) Patent No.: US 8,203,228 B2  
(45) Date of Patent: Jun. 19, 2012

(54) AEROGENERATOR

(76) Inventor: Edward Victor Smith, Aloha, OR (US)

(*) Notice: Subject to any disclaimer, the term of this patent is extended or adjusted under 35 U.S.C. 154(b) by 415 days.

(21) Appl. No.: 12/574,311

(22) Filed: Oct. 6, 2009

(65) Prior Publication Data

US 2011/0080003 A1    Apr. 7, 2011

(51) Int. Cl.
*F03D 9/00* (2006.01)
*H02P 9/04* (2006.01)

(52) U.S. Cl. .............................................. 290/55

(58) Field of Classification Search .............. 290/43, 290/44, 54, 55
See application file for complete search history.

(56) References Cited

U.S. PATENT DOCUMENTS

| 495,046   | A | * | 4/1893  | Knoche ............................ 310/22  |
| 3,676,719 | A | * | 7/1972  | Pecci .............................. 310/24  |
| 4,441,872 | A | * | 4/1984  | Seale ............................ 417/282  |
| 4,631,455 | A | * | 12/1986 | Taishoff ........................... 318/37 |
| 5,696,413 | A | * | 12/1997 | Woodbridge et al. ........... 310/15 |

* cited by examiner

*Primary Examiner* — Javaid Nasri  
(74) *Attorney, Agent, or Firm* — Sherr & Vaughn, PLLC (57) ABSTRACT

An aerogenerator is provided. The aerogenerator includes an impeller which is rotated by the wind. A rotatable shaft, a rotatable plate and a rocker arm mount the impeller to a support structure so that the impeller is rotatable, and convert the rotating motion of the impeller into linear motion. A rod is connected with the rocker arm and is reciprocated linearly. A magnet is provided on the rod and has magnetic force. An induction coil is provided outside the reciprocating magnet and interacts with the magnet to create an induced voltage. A transform unit transforms the induced voltage of the induction coil to an electric current. An electricity storage unit stores the electric current of the transform unit.

10 Claims, 12 Drawing Sheets

FIG. 1

*-Prior Art-*

AEROGENERATOR

CROSS REFERENCE TO PRIOR APPLICATIONS

This application claims the benefit of co-pending U.S. patent application Ser. No. 12/434,337 (filed on May 1, 2009), under 35 U.S.C. §120, which is hereby incorporated by reference in its entirety.

BACKGROUND OF THE INVENTION

1. Field of the Invention

The present invention relates generally to aerogenerators and, more particularly, to an aerogenerator which converts the wind-induced rotary motion of an impeller into a linear reciprocating motion, changes induced voltage generated between a magnet and an induction coil by the linear reciprocating motion into an electric current and stores the electric current, thus generating a large amount of electricity as does a conventional aerogenerator, while reducing manufacturing cost and maintenance cost.

2. Description of the Related Art

Generally, an aerogenerator is a generator which rotates a rotary impeller using naturally occurring wind to obtain rotary force and converts the rotary force into electric energy, thus supplying the electricity to a region requiring the electricity.

Such an aerogenerator includes a support shaft, a rotary body and a rotary impeller. The support shaft is placed on the ground to be supported in a vertical direction.

Further, the rotary body is provided on the upper end of the support shaft in such a way as to rotate freely. The rotary impeller is provided on the rotary body, thus generating rotary force in response to the wind.

In such an aerogenerator, the rotary body is rotated such that the rotary impeller points in the direction of the wind, thereby allowing the rotary impeller to be easily rotated by the wind.

Figure 1:
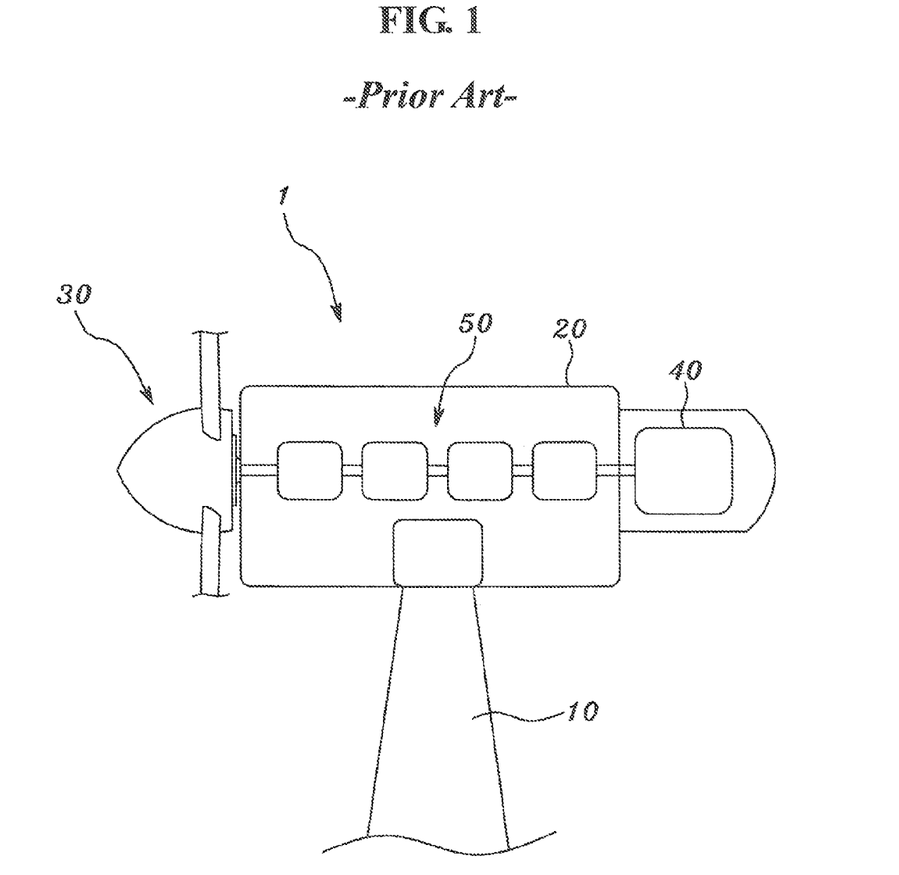
FIG. 1 is a view illustrating a conventional aerogenerator.

FIG. 1 is a view illustrating a conventional aerogenerator.

As shown in the drawing, the aerogenerator 1 includes a support shaft 10 which is set up on the ground, and a rotary body 20 which is rotatably provided on the upper end of the support shaft 10. A rotary impeller 30 is rotatably provided on the rotary body 20.

Further, a generator 40 and a rotating-force conversion unit 50 are provided in the rotary body 20. The rotating-force conversion unit 50 includes a plurality of gears to increase the rotary force of the rotary impeller 30 and transmit the increased rotary force to the generator 40.

Since the aerogenerator must generate the maximum amount of electricity per transmitted rotary force, a large capacity generator 40 is used.

However, the large capacity generator 40 is expensive, thus increasing manufacturing cost and maintenance cost.

Especially, since the heavy and large capacity generator 40 is provided in the rotary body 20, the rotary body 20 cannot easily rotate in the direction of the wind because of the weight of the generator 40. As a result, the efficiency of the aerogenerator is lowered.

Further, a rotatable shaft is bent downwards due to the large capacity generator 40, thus causing the disengagement of the gears of the rotating-force conversion unit 50. In this case, the rotating-force conversion unit 50 is frequently out of order, so that the rotary force is reduced and thus efficiency is lowered.

These problems occur in a dual rotor as well as in a single rotor.

In order to prevent the bending of the rotatable shaft and to reduce manufacturing cost and maintenance cost, there is an urgent need for an aerogenerator which uses an inexpensive small capacity generator but is capable of generating the same amount of electricity as when a large capacity generator is used, by the introduction of a good idea.

SUMMARY OF THE INVENTION

Accordingly, the present invention has been made keeping in mind the above problems occurring in the prior art, and an object of the present invention is to provide an aerogenerator, in which wind-induced rotary motion is converted into linear reciprocating motion, so that a linearly reciprocated magnet passes through an induction coil, thus generating electricity.

Another object of the present invention is to provide an aerogenerator in which a rotatable plate opposite sides about a central rotation axis of which have a different thickness, and a rocker arm, which contacts a portion of one side of the rotatable plate and is displaced according to the contact surface, are connected to a link, thus reciprocating a rod.

A further object of the present invention is to provide an aerogenerator, in which at least one magnet and induction coil is provided on the rod, thus increasing the amount of electricity which is output.

A still further object of the present invention is to provide an aerogenerator, in which an end of a rod branches out to form a plurality of branches which are parallel to a linear motion direction, and at least one magnet and induction coil is provided on the end of each branch, thus further increasing the amount of electricity which is output.

In order to accomplish the above objects, the present invention provides an aerogenerator including an impeller rotatable by the wind, a rotatable shaft which mounts the impeller to a support structure such that the impeller is rotatable, a rotatable plate provided on the rotatable shaft and shaped such that a thickness thereof increases in one direction relative to one extrapolated line perpendicular to the central rotation axis and reduces in an opposite direction relative to the extrapolated line, whereby the rotatable plate has a difference in height relative to the central rotation axis at the same position along the length of the central rotation axis when the impeller rotates, a rocker arm provided in such a way that a predetermined portion thereof is rotatably fixed to the support structure, the rocker arm having a first end contacting a surface of the rotatable plate, and operated such that, as the first end of the rocker arm is moved because of a difference in height of the rotatable plate, a second end of the rocker arm moves in a direction of the central rotation axis, a pressure member for pushing the first end of the rocker arm towards the rotatable plate such that the rocker arm is in surface contact with the rotatable plate when the rotatable plate rotates, a link rotatably provided on the second end of the rocker arm, a rod connected to the link in such a way as to be movable in a linear reciprocating motion in a direction of the length of the central rotation axis in association with the motion of the rocker arm caused by a difference in height of the rotatable plate, a magnet provided on the rod such that the magnet reciprocates with the rod, the magnet having magnetic force, an induction coil provided outside the reciprocating magnet and interacting with the magnet to create an induced voltage, a transform unit for transforming the induced voltage of the induction coil to an electric current, and an electricity storage unit for storing the electric current of the transform unit.

At least one rocker arm may be provided on the rotatable plate which has a difference in height.

A ball may be further provided on the first end of the rocker arm to reduce frictional force between the rocker arm and the rotatable plate.

At least one magnet and at least one induction coil may be provided on the rod.

An end of the rod may branch out into at least two branches in such a way as to be parallel to a linear motion direction, each of the branches having on an end thereof the magnet and the induction coil.

Further, a guide may be provided outside the rod to guide a linear reciprocating motion.

Further, a gearbox may be provided between the impeller and the rotatable shaft to change a rotation speed of the impeller.

Further, the aerogenerator may further include an auxiliary aerogenerator provided on a side opposite to the support structure to which the impeller is mounted, the auxiliary aerogenerator including an auxiliary impeller rotatable by the wind, an auxiliary rotatable shaft which mounts the auxiliary impeller to a support structure such that the auxiliary impeller is rotatable, an auxiliary rotatable plate provided on the auxiliary rotatable shaft and shaped such that a thickness thereof increases in one direction relative to one extrapolated line perpendicular to the central rotation axis and reduces in an opposite direction relative to the extrapolated line, whereby the auxiliary rotatable plate has a difference in height relative to the central rotation axis at the same position along the length of the central rotation axis when the auxiliary impeller rotates, an auxiliary rocker arm provided in such a way that a predetermined portion thereof is rotatably fixed to the support structure, the auxiliary rocker arm having a first end contacting a surface of the auxiliary rotatable plate, and operated such that, as the first end of the auxiliary rocker arm is moved because of a difference in height of the auxiliary rotatable plate, a second end of the auxiliary rocker arm moves in a direction of the central rotation axis, an auxiliary pressure member for pushing the first end of the auxiliary rocker arm towards the auxiliary rotatable plate such that the auxiliary rocker arm is in surface contact with the auxiliary rotatable plate when the auxiliary rotatable plate rotates, an auxiliary link rotatably provided on the second end of the auxiliary rocker arm, an auxiliary rod connected to the auxiliary link in such a way as to be movable in a linear reciprocating motion in a direction of the length of the central rotation axis in association with the motion of the auxiliary rocker arm caused by a difference in height of the auxiliary rotatable plate, an auxiliary magnet provided on the auxiliary rod such that the auxiliary magnet reciprocates with the auxiliary rod, the auxiliary magnet having magnetic force, an auxiliary induction coil provided outside the reciprocating auxiliary magnet and interacting with the auxiliary magnet to create an induced voltage, an auxiliary transform unit for transforming the induced voltage of the auxiliary induction coil to an electric current, and an auxiliary electricity storage unit for storing the electric current of the auxiliary transform unit.

Further, the auxiliary impeller may be placed on the same axis as the central rotation axis of the impeller, a radius of an arc formed by rotating the auxiliary impeller being equal to from 35% to 45% of a radius of a rotating arc formed by rotating the impeller.

Further, an auxiliary gearbox may be provided between the auxiliary impeller and the auxiliary rotatable shaft to change a rotation speed of the auxiliary impeller.

As described above, the present invention provides an aerogenerator, which converts rotary motion into linear reciprocating motion, and changes the induced voltage generated between a magnet and an induction coil by the linear reciprocating motion into an electric current and then stores the electric current.

Further, the present invention provides an aerogenerator, which changes a relatively small amount of induced voltage generated from each of a plurality of magnets and induction coils into electric current and stores the electric current, thus being capable of generating a large amount of electricity as do conventional aerogenerators, therefore reducing manufacturing cost and maintenance cost because of the reduction in the use of gears and relatively cheap magnets and induction coils. Consequently, the present invention is very useful and effective.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, the preferred embodiments of the present invention will be described with reference to the accompanying drawings.

Further, it is to be understood that the invention is not limited in its application to the embodiments and that various changes and modifications may be made in the invention without departing from the spirit and scope of the invention.

Figure 2:
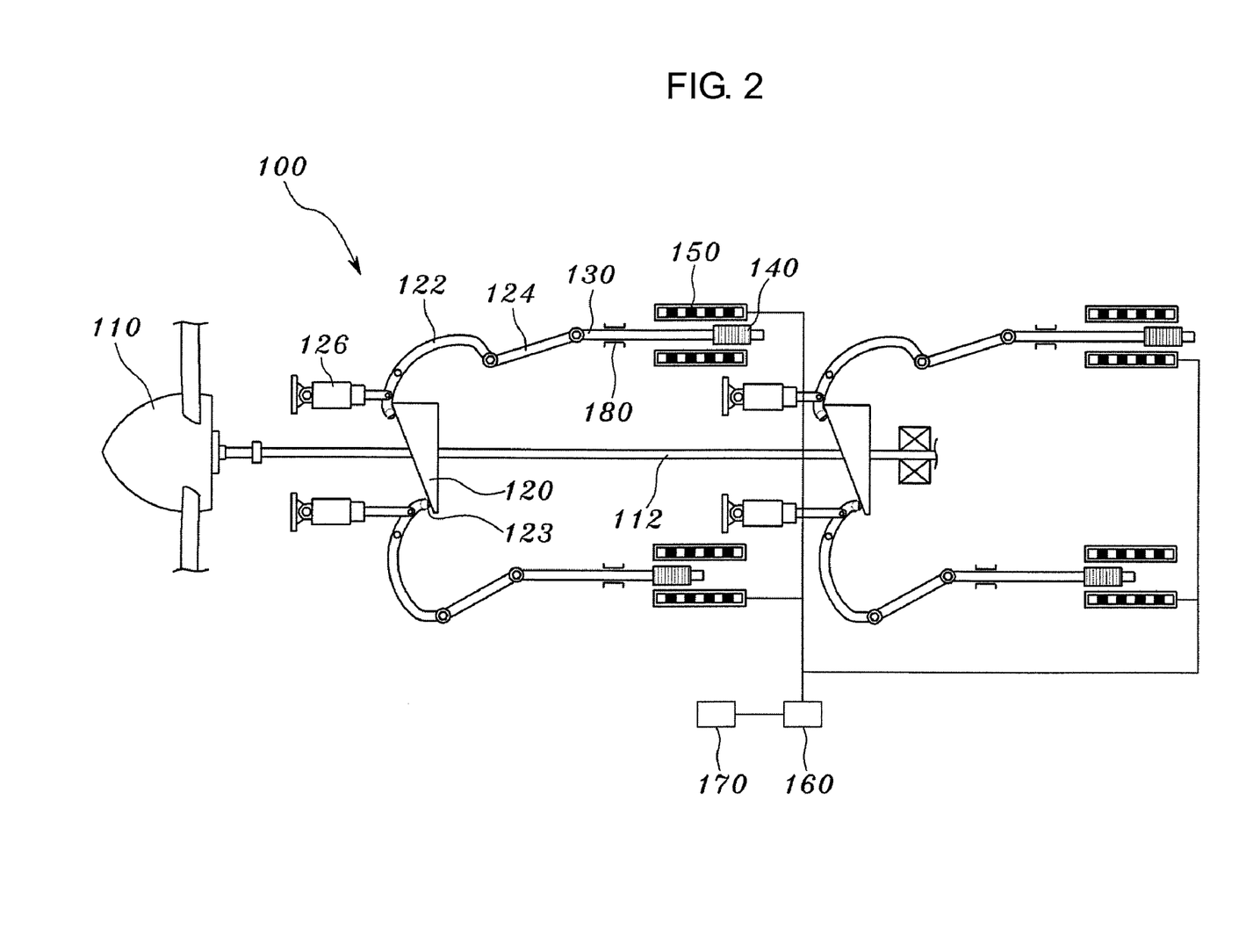
FIG. 2 is a view illustrating an aerogenerator according to an embodiment of the present invention.
Figure 3:
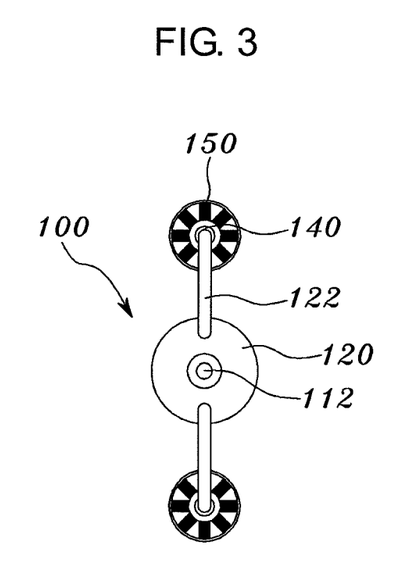
FIG. 3 is a front view illustrating the aerogenerator according to the present invention.
Figure 4:
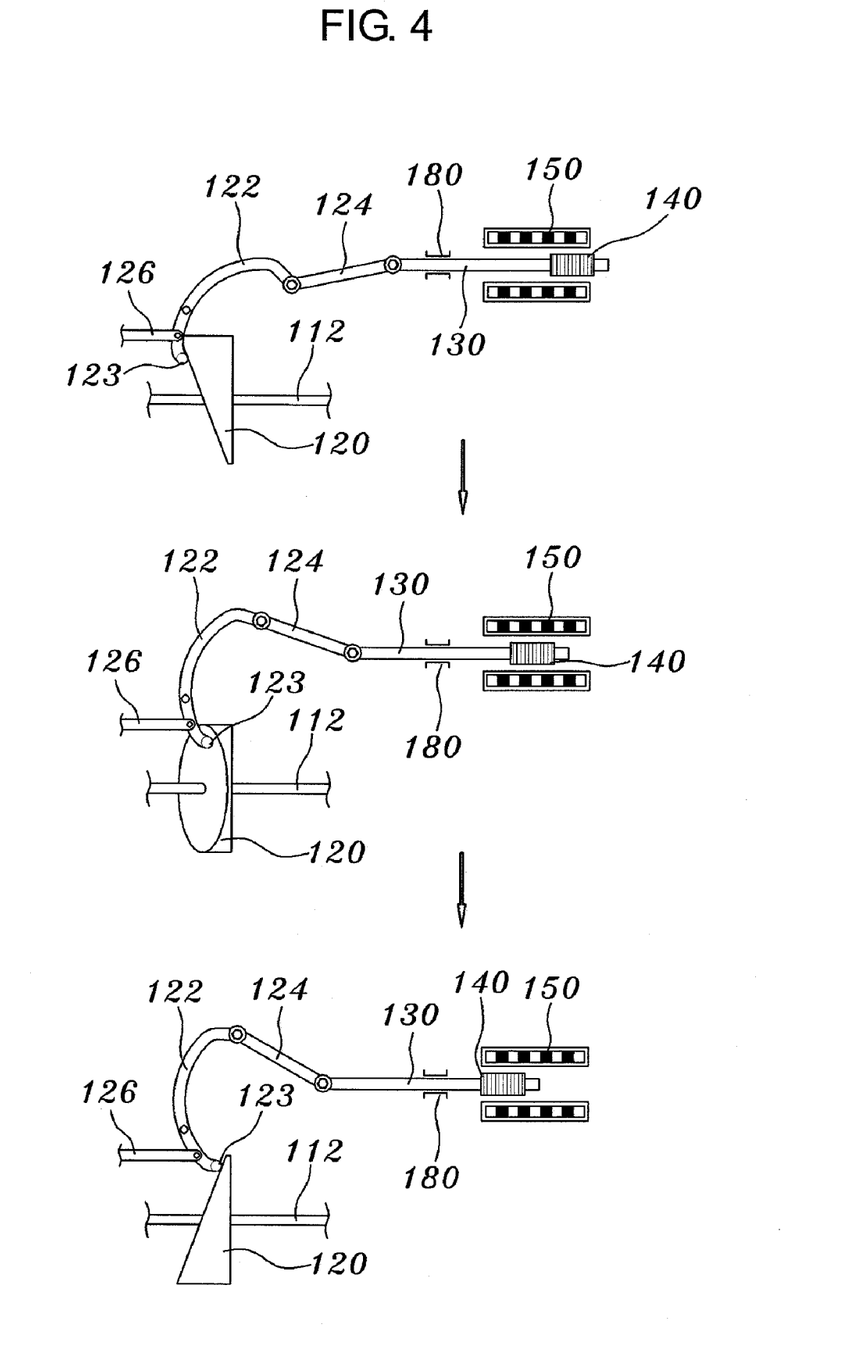
FIG. 4 is a view illustrating the operation of the aerogenerator according to the present invention.
Figure 5:
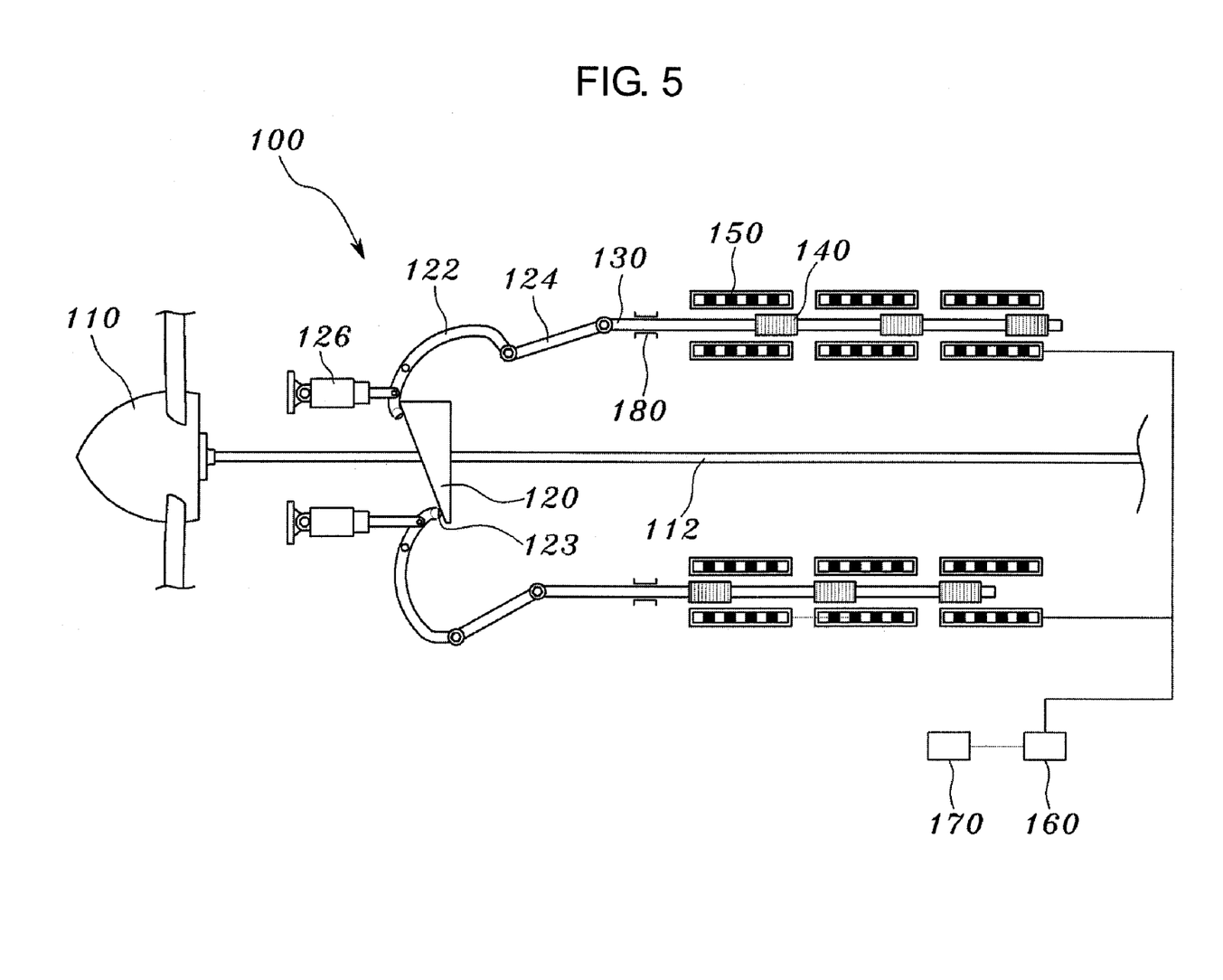
FIG. 5 is a view illustrating magnets and induction coils of an aerogenerator according to a further embodiment the present invention.
Figure 6:
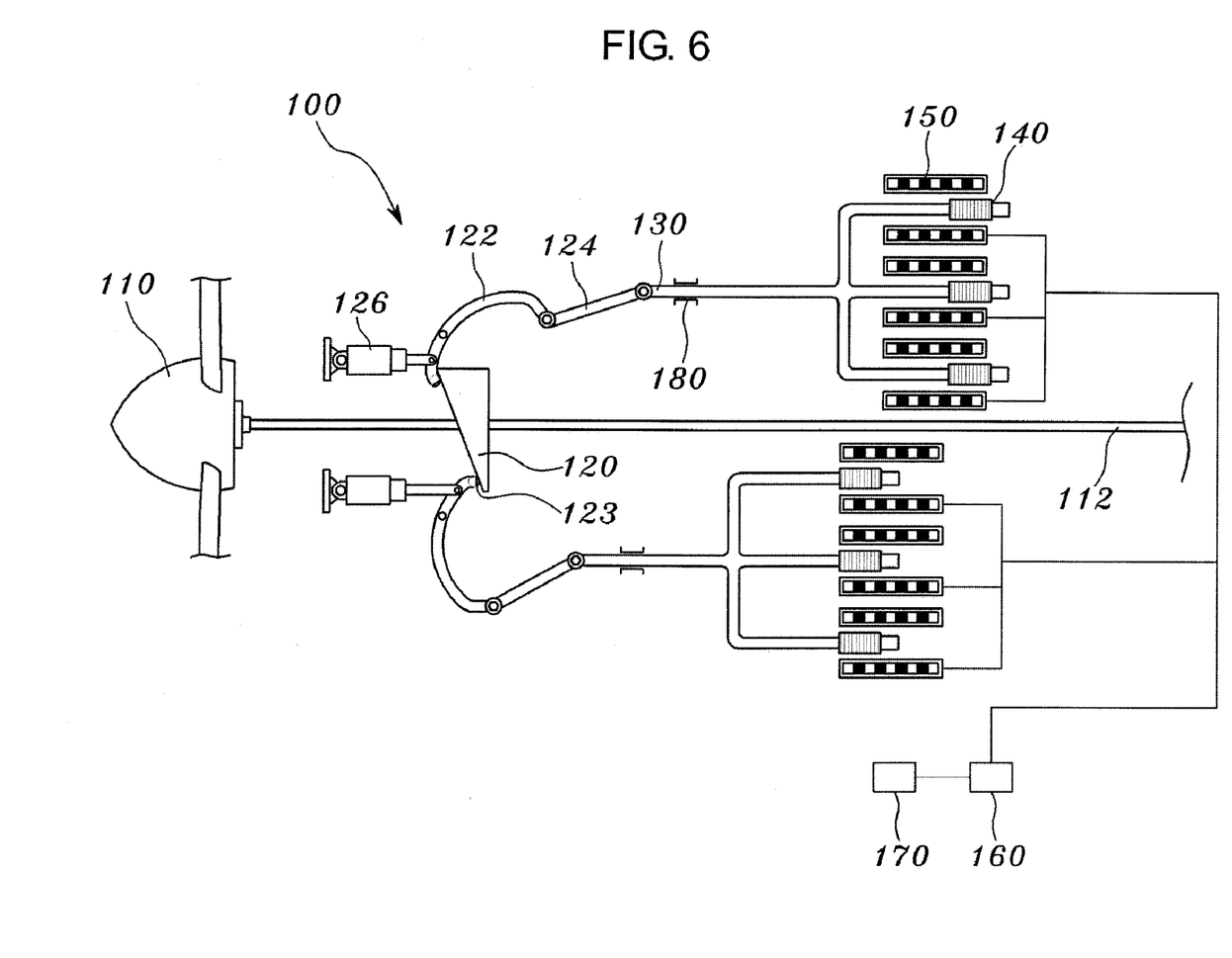
FIG. 6 is a view illustrating another arrangement of a rod, magnets and induction coils of the aerogenerator according to the present invention.
Figure 7:
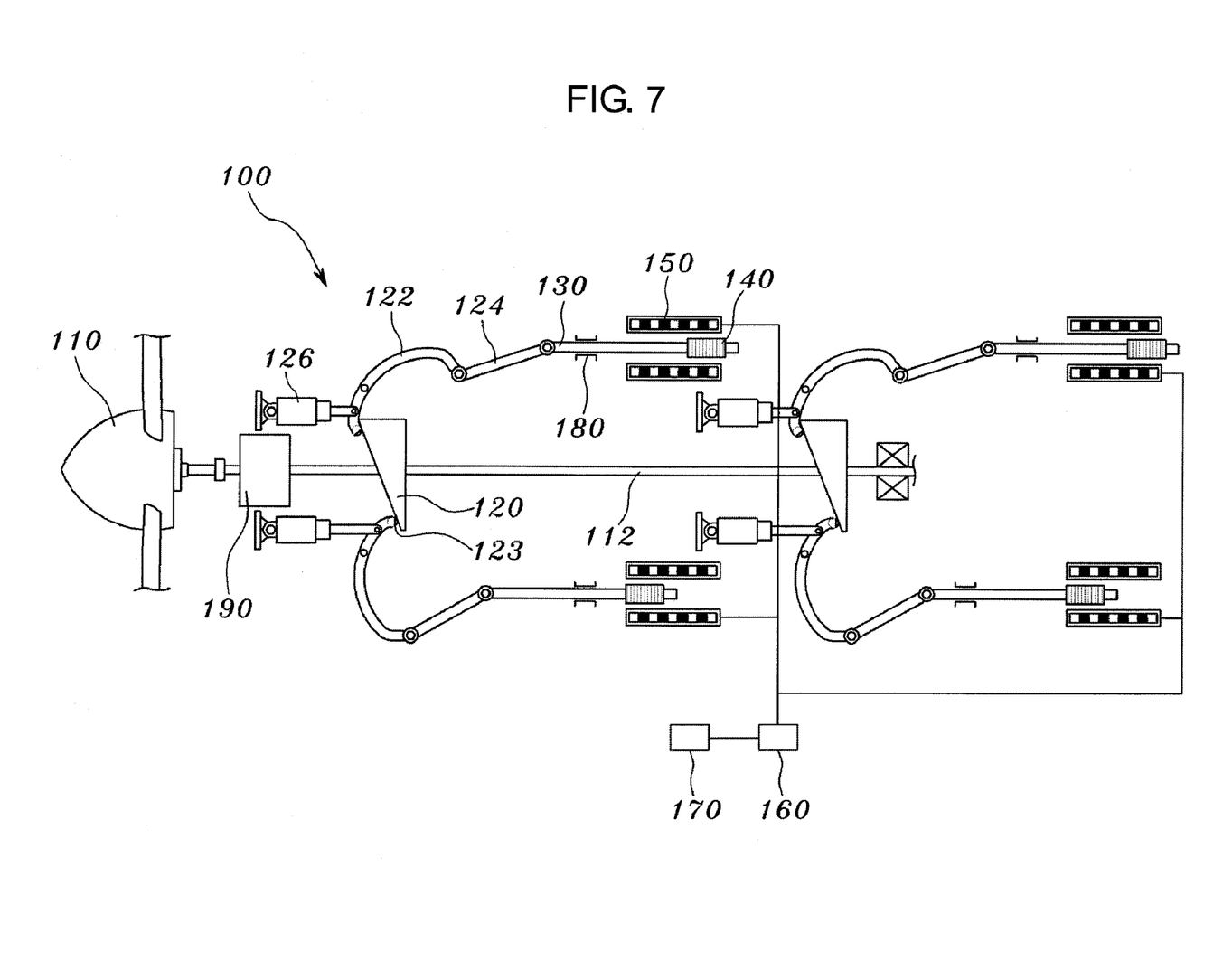
FIG. 7 is a view illustrating the aerogenerator according to the present invention in which an auxiliary gearbox is further provided.
Figure 8:
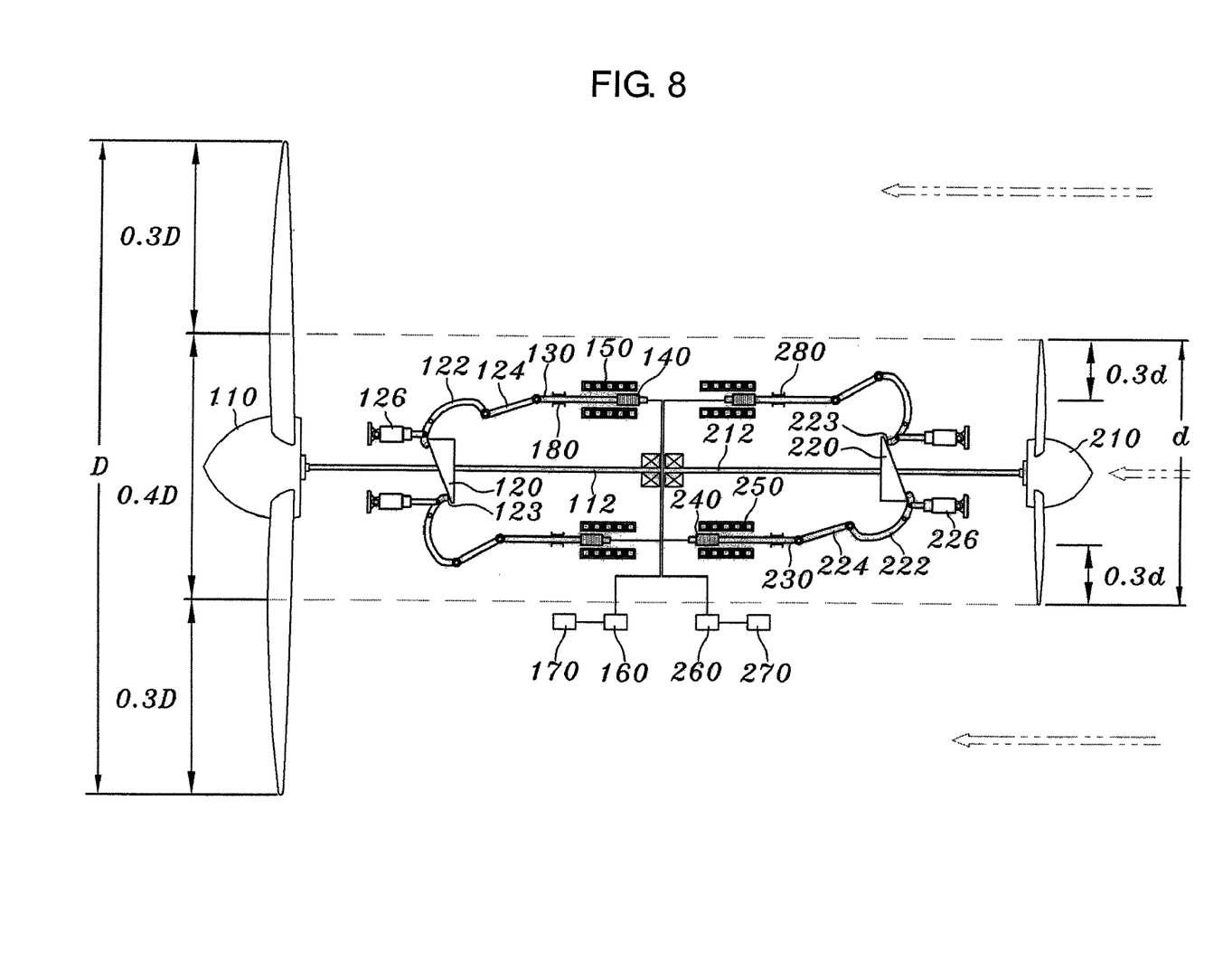
FIG. 8 is a view illustrating the aerogenerator according to the present invention in which an auxiliary aerogenerator is further provided.
Figure 9:
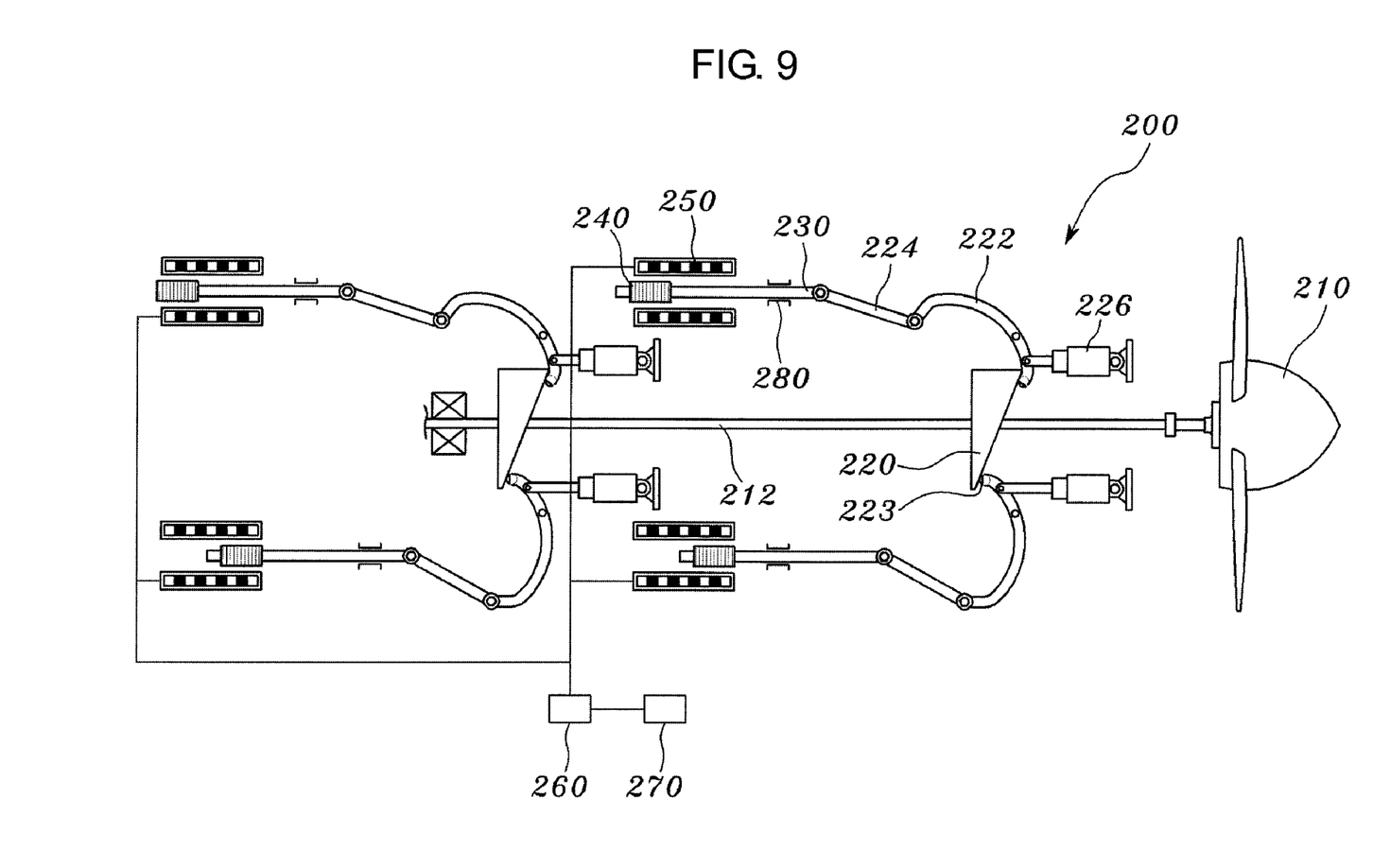
FIG. 9 is a view illustrating the auxiliary aerogenerator according to the present invention.
Figure 10:
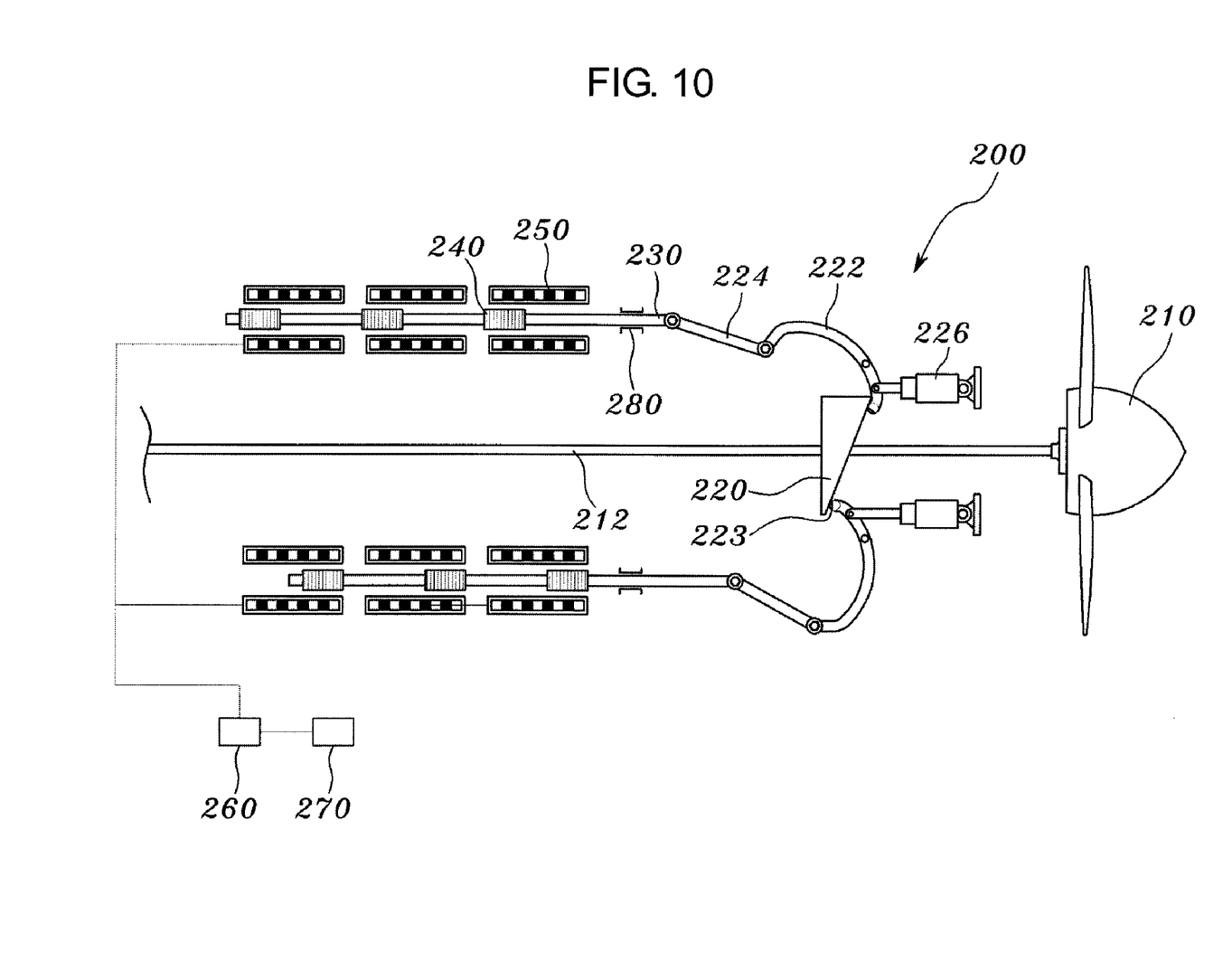
FIG. 10 is a view illustrating magnets and induction coils of the auxiliary aerogenerator according to a further embodiment of the present invention.
Figure 11:
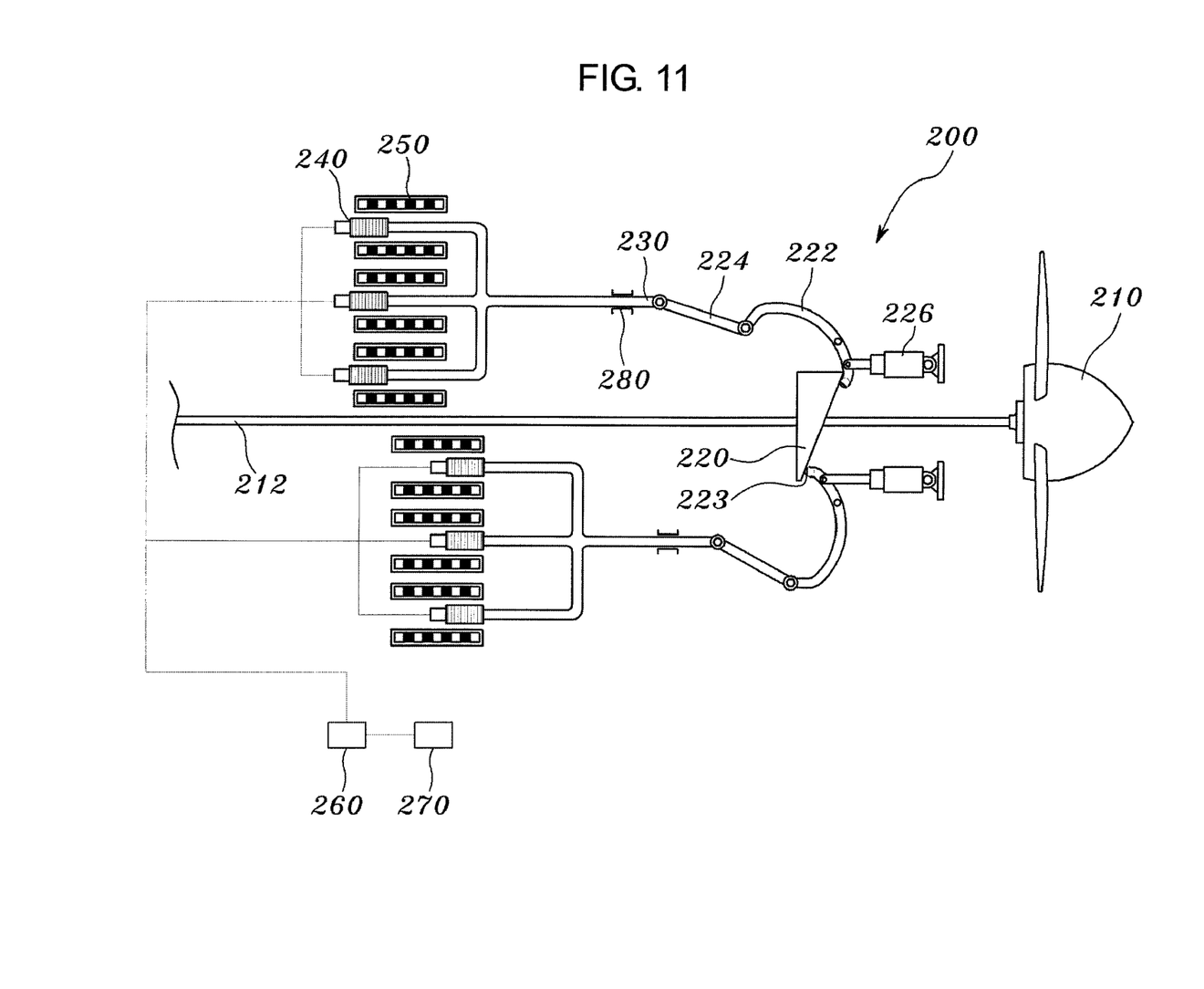
FIG. 11 is a view illustrating another arrangement of an auxiliary rod of the auxiliary aerogenerator according to the present invention.
Figure 12:
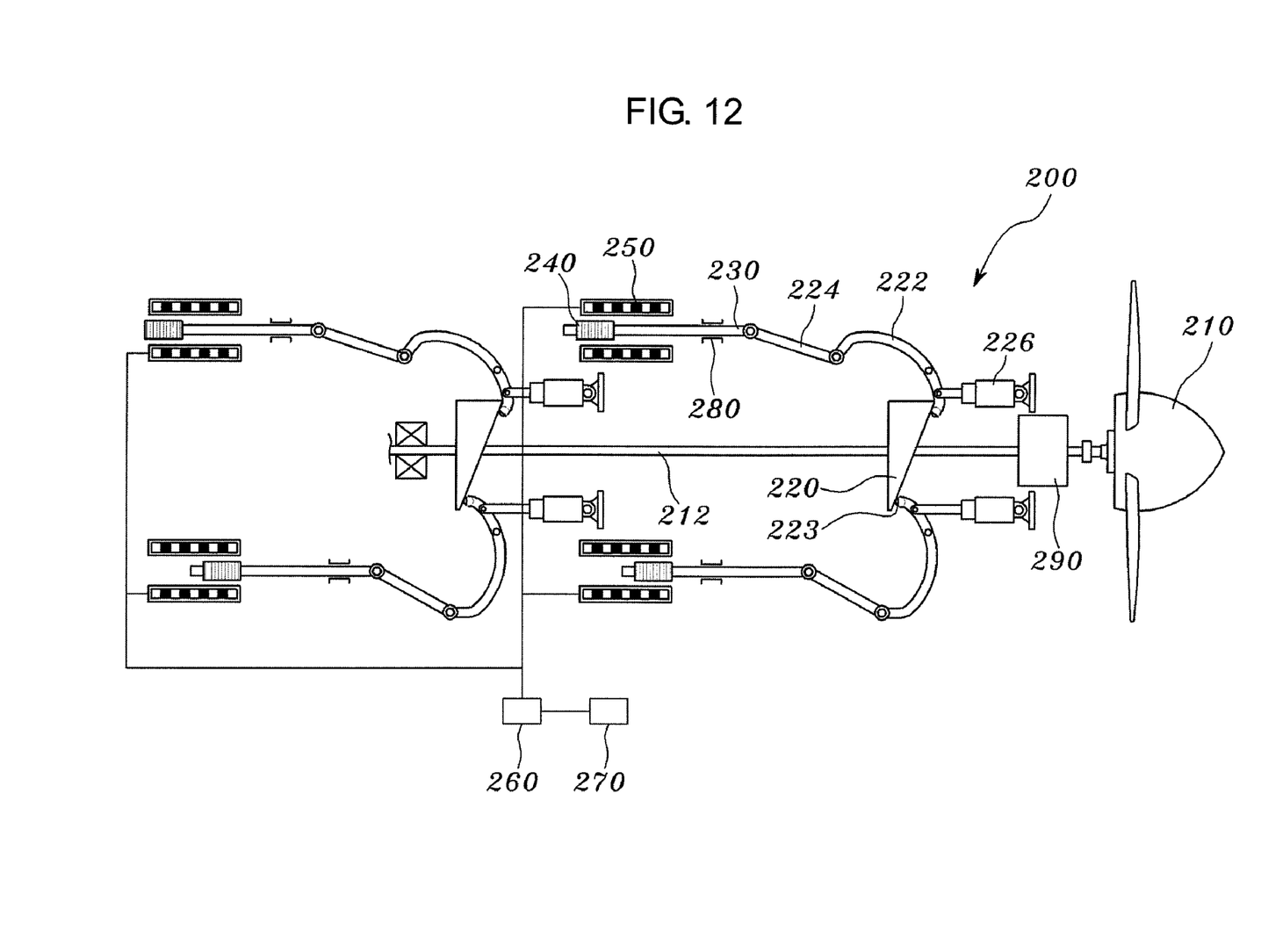
FIG. 12 is a view illustrating the auxiliary aerogenerator according to the present invention in which an auxiliary gearbox is further provided.

FIG. 2 is a view illustrating an aerogenerator according to an embodiment of the present invention, FIG. 3 is a front view illustrating the aerogenerator according to the present invention, FIG. 4 is a view illustrating the operation of the aerogenerator according to the present invention, FIG. 5 is a view illustrating magnets and induction coils of an aerogenerator according to a further embodiment of the present invention, FIG. 6 is a view illustrating another arrangement of a rod, magnets and induction coils of the aerogenerator according to the present invention, FIG. 7 is a view illustrating the aerogenerator according to the present invention in which an auxiliary gearbox is further provided, FIG. 8 is a view illustrating the aerogenerator according to the present invention in which an auxiliary aerogenerator is further provided, FIG. 9 is a view illustrating the auxiliary aerogenerator according to the present invention, FIG. 10 is a view illustrating magnets and induction coils of the auxiliary aerogenerator according to a further embodiment of the present invention, FIG. 11 is a view illustrating another arrangement of an auxiliary rod of the auxiliary aerogenerator according to the present invention, and FIG. 12 is a view illustrating the auxiliary aerogenerator according to the present invention in which an auxiliary gearbox is further provided.

As shown in the drawings, the aerogenerator 100 includes an impeller 110, a rotatable shaft 112, a rotatable plate 120, a rocker arm 122, a link 124, a pressure member 126, a rod 130, a magnet 140, an induction coil 150, a transform unit 160 and an electricity storage unit 170.

The impeller 110 is rotatable by wind. The impeller 110 is rotatably installed to a support structure (not shown) via the rotatable shaft 112.

The rotatable plate 120 is provided on the rotatable shaft 112, and is formed in a radial cam structure such that a thickness thereof increases in one direction relative to one extrapolated line perpendicular to a central rotation point and reduces in an opposite direction relative to the extrapolated line, whereby the rotatable plate 120 has a difference in height relative to the central rotation axis at the same position along the length of the central rotation axis when the impeller rotates.

The rocker arm 122 is fixed to the support structure (not shown) in such a way that a predetermined portion is rotatable. The rocker arm 122 has a first end contacting the rotatable plate 120, and operated such that, as the first end of the rocker arm 122 is moved because of a difference in height of the rotatable plate 120, a second end of the rocker arm 122 moves in a direction of the central rotation axis.

The pressure member 126 pushes the first end of the rocker arm 122 towards the rotatable plate such that the rocker arm 122 is in surface contact with the rotatable plate 120 when the rotatable plate 120 rotates.

This allows the rocker arm 122 to be repeatedly moved in a reciprocating motion because of a difference in height of the rotatable plate 120.

The link 124 is rotatably provided on a second end of the rocker arm 122, so that it is repeatedly moved together with the repeated motion of the rocker arm 122.

The rod 130 is rotatably connected with an end of the link 124.

The rod 130 is reciprocated linearly along a motion of the link 124, so that it is movable in a linear reciprocating motion in the direction of the difference in height of the rotatable plate 120 along the length of the central rotation axis.

That is, the rocker arm 122 is repeatedly moved in a direction of the difference in height of the rotatable plate 120 in such a manner as to repeatedly rotate in a circle on a basis of a predetermined portion thereof fixed to the support structure. Such a repeated rotation allows the link 124 to linearly reciprocate the rod 130.

The magnet 140 is provided on the rod 130 such that the magnet 140 reciprocates with the rod, the magnet 140 having magnetic force. The induction coil 150 is provided outside the reciprocating magnet 140. The magnet 140 repeatedly passes through the induction coil 150 because of the linear reciprocating motion of the rod 130, thus generating an induced voltage.

Here, at least one rocker arm 122 is provided on the rotatable plate 120, and it is natural that the number of rocker arms 122 corresponds to the number of links 124 and rods 130.

A ball 123 is further provided on the first end of the rocker arm 122 contacting the surface of the rotatable plate 120, thereby reducing frictional force between the rocker arm 122 and the rotatable plate 120.

The transform unit 160 transforms the induced voltage of the induction coil 150 to an electric current, and the electricity storage unit 170 stores the electric current of the transform unit.

Here, the aerogenerator is provided with one transform unit 160 and one electricity storage unit 170 to collect voltage transmitted from the respective induction coils 150 and accumulate the voltage in the form of electricity. If necessary, the transform unit 160 and the electricity storage unit 170 may be provided on each induction coil 150.

Meanwhile, as shown in FIG. 5, at least one magnet 140 and at least one induction coil 150 may be provided on each rod 130, wherein a plurality of magnets 140 is provided at regular intervals on the rod 130, and the induction coils 150 are respectively provided corresponding to the magnets 140.

This structure serves to increase the amount of voltage created per rotation, and the number of such elements installed is not limited.

Further, as shown in FIG. 6, an end of the rod 130 branches out into at least two branches in such a way as to be parallel to a direction of linear motion, each of the branches having on an end thereof the magnet 140 and the induction coil 150.

Further, each of the branches of the rod 130 is provided in parallel with a linear reciprocating motion and is provided with a guide 180.

Further, each of the branches of the rod 130 is provided with at least one magnet 140 and induction coil 150 so that it can further increase the amount of induced voltage.

Further, the guide 180 may be provided outside the rod 130 to guide a linear reciprocating motion of the rod 130, thereby preventing the magnet 140 and the induction coil 150 from colliding.

Further, as shown in FIG. 7, a gearbox 190 is further provided between the impeller 110 and the rotatable shaft 112 to change a rotation speed of the impeller 110, thereby increasing a rotation speed transmitted to the rotatable shaft 112.

This creates at least one rotation of the rotatable shaft 112 per rotation of the impeller 110, thereby increasing the frequency of the linear reciprocating motion of the rod 130 and therefore the amount of induced voltage.

As shown in FIGS. 8 and 9, the aerogenerator 100 further includes an auxiliary aerogenerator 200 provided on a side opposite to the support structure to which the impeller 110 is mounted. The auxiliary aerogenerator 200 includes an auxiliary impeller 210, an auxiliary rotatable shaft 212, an auxiliary rotatable plate 220, an auxiliary rocker arm 222, an auxiliary link 224, an auxiliary pressure member 226, an auxiliary rod 230, an auxiliary magnet 240, an auxiliary induction coil 250, an auxiliary transform unit 260 and an auxiliary electricity storage unit 270.

The auxiliary impeller 210 is rotatable by wind. The auxiliary impeller 210 is rotatably installed to a support structure (not shown) via the auxiliary rotatable shaft 222.

The auxiliary rotatable plate 220 is provided on the auxiliary rotatable shaft 222, and is formed in a radial cam structure such that a thickness thereof increases in one direction relative to one extrapolated line perpendicular to a central rotation point and reduces in an opposite direction relative to the extrapolated line, whereby the auxiliary rotatable plate 220 has a difference in height relative to the central rotation axis at the same position along the length of the central rotation axis when the auxiliary impeller rotates.

The auxiliary rocker arm 222 is fixed to the support structure (not shown) in such a way that a predetermined portion is rotatable. The auxiliary rocker arm 222 has a first end contacting the auxiliary rotatable plate 220, and operated such that, as the first end of the auxiliary rocker arm 222 is moved because of a difference in height of the auxiliary rotatable plate 220, a second end of the auxiliary rocker arm 222 moves in a direction of the central rotation axis.

The auxiliary pressure member 226 pushes the first end of the auxiliary rocker arm 222 towards the auxiliary rotatable plate such that the auxiliary rocker arm 222 is in surface contact with the auxiliary rotatable plate 220 when the auxiliary rotatable plate 220 rotates.

This allows the auxiliary rocker arm 222 to be repeatedly moved in a reciprocating motion because of a difference in height of the auxiliary rotatable plate 220.

The auxiliary link 224 is rotatably provided on a second end of the auxiliary rocker arm 222, so that it is repeatedly moved together with the repeated motion of the auxiliary rocker arm 222.

The auxiliary rod 230 is rotatably connected with an end of the auxiliary link 224.

The auxiliary rod 230 is reciprocated linearly along a motion of the auxiliary link 224, so that it is movable in a linear reciprocating motion in the direction of the difference in height of the auxiliary rotatable plate 220 along the length of the central rotation axis.

That is, the auxiliary rocker arm 222 is repeatedly moved in a direction of the difference in height of the auxiliary rotatable plate 220 in such a manner as to repeatedly rotate in a circle on a basis of a predetermined portion thereof fixed to the support structure. Such a repeated rotation allows the auxiliary link 224 to linearly reciprocate the auxiliary rod 230.

The auxiliary magnet 240 is provided on the auxiliary rod 230 such that the auxiliary magnet 240 reciprocates with the auxiliary rod, the auxiliary magnet 240 having magnetic force. The auxiliary induction coil 250 is provided outside the auxiliary reciprocating magnet 240. The auxiliary magnet 240 repeatedly passes through the auxiliary induction coil 250 because of the linear reciprocating motion of the auxiliary rod 230, thus generating an induced voltage.

Here, at least one auxiliary rocker arm 222 is provided on the auxiliary rotatable plate 220, and it is natural that the number of auxiliary rocker arms 222 corresponds to the number of auxiliary links 224 and auxiliary rods 230.

An auxiliary ball 223 is further provided on the first end of the auxiliary rocker arm 222 contacting the surface of the auxiliary rotatable plate 220, thereby reducing frictional force between the auxiliary rocker arm 222 and the auxiliary rotatable plate 220.

The auxiliary transform unit 260 transforms the induced voltage of the auxiliary induction coil 250 to an electric current, and the auxiliary electricity storage unit 270 stores the electric current of the auxiliary transform unit.

Here, the aerogenerator is provided with one auxiliary transform unit 260 and one auxiliary electricity storage unit 270 to collect voltage transmitted from the respective auxiliary induction coils 250 and accumulate the voltage in the form of electricity. If necessary, the auxiliary transform unit 260 and the auxiliary electricity storage unit 270 may be provided on each auxiliary induction coil 250.

Further, the auxiliary impeller 210 is placed on the same axis as the central rotation axis of the impeller 210. The size of the radius formed by the rotating auxiliary impeller 210 is from 35% to 45% of the radius of the rotating impeller.

Now, the rotation of the impeller 110 in the aerogenerator 100 will be described. In order for the impeller 110 to be rotated by the wind, a portion extending from each end of the impeller 110 by 30% of the diameter D of the impeller 110 is used. The portion corresponding to 30% of the diameter D of the impeller 110 may be designated as 0.3 D.

This means that wind acting on the central portion of the impeller 110 having the length of 0.4 D, excluding a portion extending from each of opposite ends of the impeller 110 by the length of 0.3 D, is not used. Thereby, the auxiliary impeller 210 having a diameter d which is equal to the diameter 0.4 D of the central portion of the impeller 110 is provided such that the auxiliary impeller 210 is rotated by wind passing through the central portion of the impeller 110 having the diameter of 0.4 D.

Preferably, the auxiliary impeller 210 is positioned to be pointed in the direction in which the wind is blowing.

Meanwhile, as shown in FIG. 10, at least one auxiliary magnet 240 and at least one auxiliary induction coil 250 may be provided on each auxiliary rod 230, wherein a plurality of auxiliary magnets 240 is provided at regular intervals on the auxiliary rod 230, and the auxiliary induction coils 250 are respectively provided corresponding to the auxiliary magnets 240.

This structure serves to increase the amount of voltage created per rotation, and the number of such elements installed is not limited.

Further, as shown in FIG. 11, an end of the auxiliary rod 230 branches out into at least two branches in such a way as to be parallel to a direction of linear motion, each of the branches having on an end thereof the auxiliary magnet 240 and the auxiliary induction coil 250. Further, each of the branches of the auxiliary rod 230 is provided in parallel with a linear reciprocating motion and is provided with an auxiliary guide 280.

Further, each of the branches of the auxiliary rod 230 is provided with at least one auxiliary magnet 240 and auxiliary induction coil 250 so that it can further increase the amount of induced voltage.

Further, the auxiliary guide 280 may be provided outside the auxiliary rod 230 to guide a linear reciprocating motion of the auxiliary rod 230, thereby preventing the auxiliary magnet 240 and the auxiliary induction coil 250 from colliding.

Further, as shown in FIG. 12, an auxiliary gearbox 290 is further provided between the auxiliary impeller 210 and the auxiliary rotatable shaft 222 to change a rotation speed of the auxiliary impeller 210, thereby increasing a rotation speed transmitted to the auxiliary rotatable shaft 222.

This creates at least one rotation of the auxiliary rotatable shaft 222 per rotation of the auxiliary impeller 210, thereby increasing the frequency of the linear reciprocating motion of the auxiliary rod 230 and therefore the amount of induced voltage.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. An aerogenerator, comprising:
an impeller rotatable by the wind;

a rotatable shaft which mounts the impeller to a support structure such that the impeller is rotatable;

a rotatable plate provided on the rotatable shaft and shaped such that a thickness thereof increases in one direction relative to one extrapolated line perpendicular to the central rotation axis and reduces in an opposite direction relative to the extrapolated line, whereby the rotatable plate has a difference in height relative to the central rotation axis at the same position along the length of the central rotation axis when the impeller rotates;

a rocker arm provided in such a way that a predetermined portion thereof is rotatably fixed to the support structure, the rocker arm having a first end contacting a surface of the rotatable plate, and operated such that, as the first end of the rocker arm is moved because of a difference in height of the rotatable plate, a second end of the rocker arm moves in a direction of the central rotation axis;

a pressure member for pushing the first end of the rocker arm towards the rotatable plate such that the rocker arm is in surface contact with the rotatable plate when the rotatable plate rotates;

a link rotatably provided on the second end of the rocker arm;

a rod connected to the link in such a way as to be movable in a linear reciprocating motion in a direction of the length of the central rotation axis in association with the motion of the rocker arm caused by a difference in height of the rotatable plate;

a magnet provided on the rod such that the magnet reciprocates with the rod, the magnet having magnetic force;

an induction coil provided outside the reciprocating magnet and interacting with the magnet to create an induced voltage;

a transform unit for transforming the induced voltage of the induction coil to an electric current; and an electricity storage unit for storing the electric current of the transform unit.

2. The aerogenerator according to claim 1, wherein at least one rocker arm is provided on the rotatable plate which has a difference in height.

3. The aerogenerator according to claim 1, wherein a ball is further provided on the first end of the rocker arm to reduce frictional force between the rocker arm and the rotatable plate.

4. The aerogenerator according to claim 1, wherein at least one magnet and at least one induction coil are provided on the rod.

5. The aerogenerator according to claim 1, wherein an end of the rod branches out into at least two branches in such a way as to be parallel to a linear motion direction, each of the branches having on an end thereof the magnet and the induction coil.

6. The aerogenerator according to claim 1, wherein a guide is provided outside the rod to guide a linear reciprocating motion.

7. The aerogenerator according to claim 1, wherein a gearbox is provided between the impeller and the rotatable shaft to change a rotation speed of the impeller.

8. The aerogenerator according to claim 1, further comprising an auxiliary aerogenerator provided on a side opposite to the support structure to which the impeller is mounted, the auxiliary aerogenerator comprising:

an auxiliary impeller rotatable by the wind;

an auxiliary rotatable shaft which mounts the auxiliary impeller to a support structure such that the auxiliary impeller is rotatable;

an auxiliary rotatable plate provided on the auxiliary rotatable shaft and shaped such that a thickness thereof increases in one direction relative to one extrapolated line perpendicular to the central rotation axis and reduces in an opposite direction relative to the extrapolated line, whereby the auxiliary rotatable plate has a difference in height relative to the central rotation axis at the same position along the length of the central rotation axis when the auxiliary impeller rotates;

an auxiliary rocker arm provided in such a way that a predetermined portion thereof is rotatably fixed to the support structure, the auxiliary rocker arm having a first end contacting a surface of the auxiliary rotatable plate, and operated such that, as the first end of the auxiliary rocker arm is moved because of a difference in height of the auxiliary rotatable plate, a second end of the auxiliary rocker arm moves in a direction of the central rotation axis;

an auxiliary pressure member for pushing the first end of the auxiliary rocker arm towards the auxiliary rotatable plate such that the auxiliary rocker arm is in surface contact with the auxiliary rotatable plate when the auxiliary rotatable plate rotates;

an auxiliary link rotatably provided on the second end of the auxiliary rocker arm;

an auxiliary rod connected to the auxiliary link in such a way as to be movable in a linear reciprocating motion in a direction of the length of the central rotation axis in association with the motion of the auxiliary rocker arm caused by a difference in height of the auxiliary rotatable plate;

an auxiliary magnet provided on the auxiliary rod such that the auxiliary magnet reciprocates with the auxiliary rod, the auxiliary magnet having magnetic force;

an auxiliary induction coil provided outside the reciprocating auxiliary magnet and interacting with the auxiliary magnet to create an induced voltage;

an auxiliary transform unit for transforming the induced voltage of the auxiliary induction coil to an electric current; and an auxiliary electricity storage unit for storing the electric current of the auxiliary transform unit.

9. The aerogenerator according to claim 8, wherein the auxiliary impeller is placed on the same axis as the central rotation axis of the impeller, a radius of an arc formed by rotating the auxiliary impeller being equal to from 35% to 45% of a radius of a rotating arc formed by rotating the impeller.

10. The aerogenerator according to claim 8, wherein an auxiliary gearbox is provided between the auxiliary impeller and the auxiliary rotatable shaft to change a rotation speed of the auxiliary impeller.

* * * * *